United States Patent
Themelis (10) Patent No.: US 10,146,102 B2
(45) Date of Patent: Dec. 4, 2018

(54) MULTISPECTRAL IRIS DEVICE

(71) Applicant: LEICA INSTRUMENTS (SINGAPORE) PTE. LTD., Singapore (SG)

(72) Inventor: George Themelis, Lindau (DE)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/657,164

(22) Filed: Jul. 23, 2017

(65) Prior Publication Data
US 2018/0052382 A1    Feb. 22, 2018

(30) Foreign Application Priority Data
Aug. 17, 2016  (EP) .................................. 16184475

(51) Int. Cl.
| | |
|---|---|
| *G03B 9/08* | (2006.01) |
| *G03B 9/06* | (2006.01) |
| *G02B 21/00* | (2006.01) |
| *G02B 21/36* | (2006.01) |
| *G03B 11/00* | (2006.01) |
| *G03B 9/02* | (2006.01) |
| *G03B 9/07* | (2006.01) |
| *G02B 21/16* | (2006.01) |

(52) U.S. Cl.
CPC ........... *G03B 9/06* (2013.01); *G02B 21/0012* (2013.01); *G02B 21/361* (2013.01); *G03B 11/00* (2013.01); *G02B 21/16* (2013.01); *G03B 9/02* (2013.01); *G03B 9/07* (2013.01); *G03B 9/08* (2013.01)

(58) Field of Classification Search
CPC ...................................................... G03B 9/08
USPC ......................................................... 396/510
See application file for complete search history.

(56) References Cited

U.S. PATENT DOCUMENTS

| | | | |
|---|---|---|---|
| 8,374,404 B2* | 2/2013 | Williams | ............. G06K 9/2018 |
| | | | 382/115 |
| 2009/0290198 A1 | 11/2009 | Hamano et al. | |
| 2010/0066854 A1* | 3/2010 | Mather | .................. G02B 5/005 |
| | | | 348/222.1 |

(Continued)

*Primary Examiner* — Clayton E Laballe
*Assistant Examiner* — Kevin Butler
(74) *Attorney, Agent, or Firm* — Hodgson Russ LLP (57) ABSTRACT

The invention relates to an iris device (1) for optical imaging systems (71), comprising an aperture arrangement (5) and to a medical imaging system (72) comprising a sensor (15), in particular a camera (15a). Conventional iris devices (1) known from the art unavoidably suffer a necessary trade-off between the depth of field and the amount of light transmitted through the optical system (71), i.e. in particular the amount of light incident on the sensor (15). This disadvantage results from the fact that iris devices (Wo one) of the art transmit or reject light in the same way for all wavelengths (43), i.e. show a spectrally flat transmission property. The disadvantages of prior art iris devices (1) are overcome by the present invention by providing an aperture arrangement (5) which comprises simultaneously at least two apertures (5a) coaxially arranged with respect to a light-transmission direction (70), each of the at least two apertures (5a) limiting light in a different spectral band (49) of the at least two discrete non-overlapping spectral bands (49). The inventive medical imaging system (72) solves the above disadvantages by further comprising at least one inventive iris device (1).

14 Claims, 6 Drawing Sheets

(56) References Cited

U.S. PATENT DOCUMENTS

| | | | |
|---|---|---|---|
| 2010/0079884 A1* | 4/2010 | Gere | G02B 5/20 |
| | | | 359/887 |
| 2013/0016220 A1* | 1/2013 | Brown | G01J 3/2823 |
| | | | 348/164 |
| 2013/0306880 A1 | 11/2013 | Yamano et al. | |
| 2017/0017135 A1* | 1/2017 | Toriumi | G03B 9/06 |
| 2018/0052382 A1* | 2/2018 | Themelis | G03B 9/06 |

* cited by examiner

MULTISPECTRAL IRIS DEVICE

CROSS REFERENCE TO RELATED APPLICATIONS

This application claims priority of European patent application number 16184475.8 filed Aug. 17, 2016, the entire disclosure of which is incorporated by reference herein.

FIELD OF THE INVENTION

The invention relates to an iris device for optical imaging systems, comprising an aperture arrangement. The invention further relates to a medical imaging system comprising a sensor, in particular a camera.

BACKGROUND OF THE INVENTION

Conventional iris devices are known in the art and are commonly used in optical imaging systems. A single iris is the simplest embodiment of an iris device. The iris or aperture stop is an important element in most optical systems. The iris of an optical system limits the amount of light passing through said optical system and reaching a sensor. If the iris is not embodied as a separate element, the optical elements of the optical system itself may constitute the iris, e.g. by the diameter of a lens.

However, as monochromatic aberrations of the optical system increase with the possible distance of a light beam, which is a common model for the description of optical systems, to the optical axis of the optical system, it is often desired to limit the light beams passing through the optical system to paraxial light beams, i.e. light beams in the proximity of the optical axis.

In the art, commonly iris diaphragms are applied for this purpose. Such iris diaphragms allow to variably determine the amount of light which is passing through the optical system.

The iris or aperture stop further effects the depth of field (DOF) of the optical system. The DOF, also called depth of sharpness or depth of focus, defines the range of distances which can be focused by an optical imaging system.

The DOF shows an inverse functional dependence on the diameter of the aperture, wherein the diameter of the aperture corresponds to twice the distance of a light beam farthest away from the optical axis. Those light beams with the maximum possible distance away from the optical axis may be referred to as marginal rays.

In other words, the larger the diameter of the aperture, the shallower is the DOF. A decreasing diameter of the aperture, on the contrary, increases the DOF. Consequently, in irises of the art, the amount of light passing through an optical system, in particular an optical imaging system, may only be increased at the expense of a shallower DOF.

Accordingly, an increased DOF may only be obtained at the expense of a decreased amount of light transmitted through the optical system.

Therefore, a conventional iris unavoidably results in a trade-off between the DOF and the amount of light transmitted through the optical system, i.e. in particular the amount of light incident on the sensor.

Surgical microscopes, as an exemplary field of application, offer different imaging modes which may have different optical iris settings. Specifically, in color reflectance mode, illumination of a sample may be sufficiently intense, and conveniently a conventional iris is used to set a small diameter which increases the DOF, thus allowing better focus of uneven surfaces.

In a fluorescence mode of the exemplary surgical microscope, a sample is excited by illumination with radiation having an excitation wavelength, wherein the sample emits fluorescent light upon its excitation. The fluorescent light is commonly red-shifted, i.e. the fluorescence wavelength is longer than the excitation wavelength.

As the number of photons of the fluorescence emitted per exciting photon, i.e. the quantum yield, is commonly well below 10%, the iris should be open to collect as many of the fluorescence photons as possible.

The simultaneous inspection of a sample in color reflectance mode and fluorescence mode therefore requires a compromise, since a conventional iris does not allow simultaneous application of different aperture sizes. Either the DOF is increased at the expense of the fluorescence sensitivity or the fluorescence sensitivity is increased at the expense of a decreased DOF.

An iris of the art transmits or rejects light in the same way for all wavelengths, i.e. it is not wavelength-selective and a shows a spectrally flat transmission property.

SUMMARY OF THE INVENTION

One object of the present invention is therefore to provide an iris device which overcomes the above disadvantages of prior art iris devices, and which, referring exemplarily to the above-mentioned example, may provide an open aperture for fluorescence light and a closed aperture for the color reflectance, thereby allowing simultaneous optimal iris settings for both imaging modes.

The disadvantages of prior art iris devices are overcome by the iris device mentioned in the beginning by providing an iris device whose aperture arrangement comprises an integrated filter system limiting the light at different degrees at at least two different wavelengths.

The inventive iris device may therefore simultaneously limit the light at two or more wavelengths at different degrees.

The at least two wavelengths may be located in at least two discrete non-overlapping spectral bands.

A first range of wavelengths may compose a first waveband being effected by the filter system with a first degree of limitation.

Further, a second range of wavelengths may compose a second waveband being effected by the filter system simultaneously with the first waveband but with a second degree of limitation being different to the first degree of limitation.

In an embodiment of the inventive iris device, the filter system comprises a filter with at least one light transmitting spectral band.

The light transmitting spectral band may have a transmission close to 1 for at least one wavelength, preferably for a multitude of wavelengths or a range of wavelengths. A range of wavelengths, i.e. a spectral band encompasses an infinite number of individual wavelengths. The transmission is preferably constant over the complete spectral band.

In yet another embodiment of the inventive iris device, the filter system comprises a filter with at least one light blocking spectral band.

The at least one light blocking spectral band may have a transmission close to zero, i.e. it may be opaque for at least one wavelength, preferably for a multitude of wavelengths or a range of wavelengths, wherein the transmission is preferably constant over the complete range, i.e. the complete spectral band. The complete spectral band with transmission of 1 most preferably does not overlap with the spectral band of zero transmission.

The medical imaging system mentioned above overcomes the disadvantages of prior art medical imaging systems in that it comprises at least one inventive iris device.

In the following, further embodiments of the present invention will be described. Those embodiments are advantageous on their own, whereas technical features of the embodiments may be arbitrarily combined or omitted to improve the above embodiment of the inventive iris.

The inventive iris device represents a multispectral iris device, the transmission behavior of which depends on the wavelength, i.e. varies along the optical spectrum. The multispectral iris device thus comprises a multispectral aperture arrangement which may alternatively be denoted as multispectral imaging aperture or multispectral imaging iris.

In an embodiment of the inventive iris device, the filter system comprises at least one ring-shaped edge filter which surrounds a central aperture region, wherein the central aperture region is an aperture, in particular, for one of the at least two discrete non-overlapping spectral bands.

The edge filter may comprise a spectral filter edge which spectrally separates a first spectral band from a second spectral band.

This embodiment has the advantage that the means for providing two different apertures at the at least two discrete non-overlapping spectral bands are embodied by one single filter.

The filter system preferably denotes a part of the iris, which comprises at least one filter. The filter system may therefore comprise a frame for receiving the filter and for fixing and stabilizing the filter. The filter system may comprise two or more filters and may arrange said filters adjacent to each other in an aligned manner, whereas the filter system may also align different filters in a small angle to each other in order to avoid parallel surfaces, which may represent a Fabry-Perot interferometer.

The edge filter may have two distinct filter bands, i.e. two discrete non-overlapping spectral bands, whereas the linear transmission in one band may be preferably more than 90% smaller, more preferably more than 95% smaller and most preferably more than 99% smaller than in the second band. The ideal edge filter may be designed to transmit 100% of the incoming light in the first spectral band and to block 100% of the incoming light in the second spectral band. The ideal edge filter furthermore may comprise an infinitely steep edge that an edge wavelength, whereas no other transmission values except 0% and 100% may exist.

A real world filter may not comprise such an infinitely steep filter edge and may thus comprise a functional dependence of the transmission on wavelength which may be similar to a sigmoid function.

The edge filter is embodied in a ring-shape, i.e. surrounds an inner portion without the filter, which is the aperture region. The inner portion is circular and comprises a diameter, which defines the aperture diameter for the spectral band being blocked by the edge filter.

The edge filter may be a low-pass or high-pass filter, wherein the low-pass filter may be highly transparent for wavelengths smaller than an edge wavelength and opaque for wavelengths higher than the edge wavelength. The high-pass filter may be opaque for wavelengths smaller than the edge wavelength and highly transparent for wavelengths higher than the edge wavelength. In this disclosure, the term "highly transparent" denotes a transmissivity close to 1 and the term "opaque" denotes a transmissivity close to zero.

It is furthermore noted that a high-pass filter in the wavelength domain corresponds to a low-pass filter in the frequency domain.

An edge filter as described above may also comprise a highly transparent spectral band for which the transmissivity is below 1, however, the spectral band transmitted through the ring-shaped outer region of the filter would be attenuated, which in turn may compromise the homogeneity of illumination with the transmitted spectral band.

One exemplary edge filter of this embodiment may thus be transparent for the spectral band of fluorescence emission, but may be opaque for the rest of the spectrum. A physical aperture at the center of such a filter, i.e. the central aperture region, makes the inventive iris device behave like a conventional closed iris for the rest of the spectrum, while the filter is highly transparent at the fluorescence emission spectral band, i.e. the filter is essentially invisible for fluorescence light. Consequently, the filter behaves like a conventional iris completely open for the fluorescence emission spectral band.

The rest of the spectrum denotes light with a wavelength below the edge wavelength of the high-pass edge filter, in particular below the spectral band of fluorescence emission.

This embodiment of the inventive iris device is therefore a multispectral iris device and provides an open aperture for the fluorescence emission spectral band, in which band only a low light intensity is available as compared to the visible spectral band, for which the multispectral iris device provides a closed aperture. By such means, a color reflectance mode of a surgical microscope, which mode applies the visible spectral band, may profit from a closed aperture and consequently the resulting increased DOF, whereas the simultaneously applied fluorescence mode, which applies the fluorescence emission spectral band, may profit at the same time from a completely open aperture, which allows collecting as many of the rare fluorescence photons as possible.

One of the at least two discrete non-overlapping spectral bands may comprise a fluorescence band of a sample under study, i.e. the fluorescence wavelength may be transmitted through the inventive iris device with a first aperture, whereas visible wavelengths in a second spectral band, this second spectral band being different from the first spectral band comprising the fluorescence band, may be transmitted through the inventive iris device with a second aperture being different to the first aperture. Different apertures are to be understood as apertures with a different diameter.

Consequently, in the particular example given above, the fluorescence band may be transmitted through the iris device with the aperture being open, whereas the second spectral band may be transmitted through the iris with a decreased throughput.

An iris device may be embodied as a disc-shaped element, wherein the disc may comprise a ring-shaped iris frame which may surround the aperture arrangement. The iris frame may have an inner diameter, which may represent the maximum diameter $D_{max}$. An open aperture is therefore to be understood as an iris with the diameter $D_{max}$.

Aperture diameters D being smaller than $D_{max}$ result in an increased attenuation, respectively a decreased throughput which may be easily calculated with the following formula:

$$\text{attenuation} = 1/\text{throughput} = (D/D_{max})^2 \quad \text{(eq. 1)}.$$

The light-transmission direction of the iris device is a direction parallel to an optical axis of the iris device. The light-transmission direction may be unidirectional or bidirectional.

The coaxial arrangement of the at least two apertures with respect to the light-transmission direction is to be understood in the sense that the at least two apertures are each being positioned essentially centered and essentially perpendicular to the optical axis.

An aperture is to be understood as an element that limits light by means of a portion of the aperture blocking the light. The aperture commonly denotes the opening which transmits the light but may also be understood as an element comprising such an opening.

A spectral band is to be understood as a range of wavelengths or optical frequencies.

In another embodiment of the inventive iris device, the aperture arrangement may simultaneously comprise at least two apertures which may be arranged coaxially with respect to a light-transmission direction, wherein each of the at least two apertures may limit light in a different spectral band of at least two discrete non-overlapping spectral bands.

In a further advantageous embodiment of the inventive iris device, the filter system may comprise at least one ring-shaped band-stop filter limiting the light of at least one of the at least two discrete non-overlapping spectral bands.

A band-stop filter may have the advantage that the light of a predetermined spectral band may be limited by such a band-stop filter. The affected spectral band may be denoted as spectral block band (the light blocking spectral band) and may comprise a predetermined wavelength region. Only light of wavelengths in the spectral block band may be limited by the band-stop filter.

The band-stop filter may be embodied as the above described edge filter, i.e. it may be embodied in a ring-shape with a physical aperture in its center. The physical aperture may therefore be highly transparent for all wavelengths incident on the band-stop filter, whereas all wavelengths located in the spectral block band may be blocked in the ring-shaped outer portion of the band-stop filter and may be transmitted through the physical aperture only. All wavelengths located in the spectral block band may therefore be transmitted through an aperture of diameter D, whereas wavelengths not comprised in the spectral block band are transmitted through an aperture of diameter $D_{max}$, with D being smaller than $D_{max}$.

Limiting the light of at least one of the at least two discrete non-overlapping spectral bands is therefore to be understood as clipping or reducing the aperture for light of the spectral block band.

The band-stop filter may preferentially be opaque for the spectral block band and preferentially highly transparent for the spectral bands adjacent to the spectral block band.

In another advantageous embodiment of the inventive iris device, the filter system may comprise at least one bandpass filter.

A bandpass filter may be advantageous if a pre-selection of a spectral band to be observed is desired.

The bandpass filter may comprise a spectral transmission band and two spectrally adjacent spectral block bands.

The combination of two edge filters may represent the easiest way for obtaining such a bandpass filter.

The bandpass filter of this embodiment may comprise a low-pass edge filter and a high-pass edge filter, wherein the filter edge of the low-pass edge filter may be located at a low-pass wavelength which is higher than a high-pass wavelength, the high-pass wavelength representing the filter edge of the high-pass edge filter. For wavelengths located between the high-pass wavelength and the low-pass wavelength, the bandpass filter may be highly transparent, whereas it may be opaque for all wavelengths lower than the high-pass wavelength and higher than the low-pass wavelength.

In another embodiment of the inventive iris device, a multitude of filters is comprised. The filters are preferentially band-stop filters and this embodiment may further comprise a bandpass filter for pre-selecting the spectral band to be observed.

The embodiment comprising only a multitude of band-stop filters has the advantage that, according to the number of band-stop filters, a multitude of apertures may be provided for the respective spectral bands, which apertures only apply to the respective spectral band affected by the respective individual band-stop filter. In other words, for each spectral band of the multitude of spectral bands, a different aperture may apply, which in turn denotes that each spectral band of the multitude of spectral bands may have a different throughput and the different throughput of the spectral bands may form a specific throughput spectrum.

In yet another embodiment of the inventive iris device, the aperture of a first spectral band defined by a first band-stop filter is smaller or larger than each of the apertures of a second and third spectral band defined respectively by a second and third band-stop filter, the first spectral band being spectrally located between the second and a third spectral band.

This embodiment of the inventive iris device may thus provide a wavelength-dependent local minimum or local maximum in aperture diameters, i.e. the specific throughput spectrum desired may advantageously comprise local minima and/or local maxima as well.

In another embodiment of the inventive iris device, the filter system comprises at least one linear variable edge filter having a spectral filter edge, whose spectral filter edge varies depending on the distance to an optical axis of the iris device.

This embodiment is especially advantageous if only one single filter may be received in the filter system, e.g. due to spatial limitations.

The variation of the filter edge, i.e. the edge wavelength, therefore varies along a radial direction, wherein the radial direction is oriented essentially perpendicular to the optical axis of the iris device.

The linear variable edge filter of this embodiment may be a short-past filter which transmits only wavelengths shorter than the wavelength of the filter edge, wherein this wavelength of the filter edge varies linearly along the radial direction. It is therefore conceivable to provide a multispectral iris device with a single filter comprising one single coating, which coating furthermore matches a custom throughput spectrum with a high spectral resolution.

It is noted that this embodiment, which is based on short- or long-pass filters, is limited to throughput spectra which are monotonic functions of the wavelength. A variable band-stop filter with a similar spatial dependence of the blocked spectral bands circumvents these limitations and allows providing multispectral iris devices with virtually any throughput spectrum.

The at least one filter of the iris device may comprise a filter subsystem, which filter subsystem may comprise at least a substrate and at least one filter layer embodied on the substrate. Most preferably, a filter is fabricated by coating the substrate with the desired filter.

The substrate may be chosen to be highly transparent for all spectral bands to be inspected and/or transmitted via the iris. Exemplarily, a substrate comprising a simple glass may be preferentially applied in the visible and near-infrared spectral range, whereas for applications using an ultraviolet spectral band, a substrate comprising exemplarily fused silica, quartz glass, fluorides or sapphire are more suitable.

Another approach may be to choose the substrate such that certain undesired spectral bands may be blocked by the substrate itself, which may reduce the cost of an additional blocking filter. In such an approach for instance ultraviolet wavelengths may be blocked by the substrate. Similarly, substrates may be applied which block mid-infrared and infrared radiation in order to avoid heating of the samples under study.

In another embodiment of the inventive iris device, a multitude of filter layers is embodied on a substrate.

The multitude of filter layers may be embodied on a single substrate, i.e. on one and the same substrate, which has the advantage of preventing the occurrence of a Fabry-Perot interferometer introducing unwanted disturbing effects. Furthermore, such an embodiment saves costs and space, which may be especially advantageous in case of spatial limitations for the iris device.

It is also possible that each filter is embodied on a separate substrate or that only a subset of a multitude of filters is embodied on a single substrate.

An embodiment applying a single substrate has the further advantage that only one element has to be aligned within the iris device, in particular with respect to the optical axis, respectively the light-transmission direction of the iris device. The coaxial arrangement of the at least two apertures with respect to the light-transmission direction is therefore performed automatically within one step of production.

In yet another embodiment of the inventive iris device, according to at least one of a source of illumination encompassing a range of spectral densities and a sensor used in the optical imaging system encompassing a range of spectral sensitivities, the first band-stop filter for the at least one first spectral band in which at least one of a high spectral density of the source of illumination and a high sensor sensitivity applies, are embodied with the first aperture, whose diameter is smaller than the diameter of the at least one second aperture of the second band-stop filter for a spectral band in which at least one of a low spectral density of the source of illumination and a low sensor sensitivity applies.

This embodiment is especially advantageous in digital color imaging, where each of the colors, representing a separate spectral band, has a different optimal throughput. Two main factors which require or motivate using different throughputs for different colors are for example the sensor sensitivity and the light source spectrum.

The sensor sensitivity is not a flat curve but is described by a function depending on the wavelength incident on the sensor. Silicon, for example, has considerable lower sensitivity for incident blue light (around 480 nanometers) and is commonly most sensitive in a spectral band covering the red light (around 650 nanometers) and the near infrared light (0.75-1.4 micron).

Furthermore, light source spectra as for instance halogen bulbs emit according to the black body radiation law, i.e. for the visible spectrum, the intensity increases almost exponentially with the wavelength. Consequently, the spectral density in the blue spectral region is low, whereas it is high in the red and near-infrared region.

Usually this suboptimal color distribution is compensated for by optical filters attenuating those spectral bands with high sensitivity or illumination intensity or by digital filters rebalancing the colors.

The above embodiment of the inventive iris device allows addressing this problem in a more efficient way, as the different apertures provided for the different spectral bands attenuate the intensity of the corresponding spectral band in a way simultaneously increasing the DOF.

Furthermore, digital filters rebalancing the colors incident on a sensor have the disadvantage that a spectral range with low intensity and a spectral range with high intensity may not be detected by the sensor with the same dynamic range. This disadvantage may be mitigated by means of the multispectral iris device of this embodiment, which allows the sensor to be operated within the same dynamic range for all colors.

One simple example of this embodiment is to provide three apertures of different size, whereas the spectral band with the lowest sensor sensitivity respectively the lowest light intensity has the largest aperture for transmitting as much light as possible, the second spectral band with a medium sensor sensitivity respectively a medium light intensity has a medium aperture, whose size is smaller than for the first spectral band, finally the third spectral band with a high sensor sensitivity respectively a high light intensity is embodied with a small aperture, whose size is smaller than the aperture of the first spectral that band and smaller than the aperture of the second spectral band.

Such an embodiment could be realized by providing two low-pass edge filters, wherein the spectral edge of the first filter is located in between the first and the second spectral band and provides the medium aperture, whereas the second lower-pass edge filter comprises a spectral edge located in between the second and third spectral band and provides the small aperture. The first spectral band is therefore transmitted through the first and second filter and is solely affected by the maximum diameter $D_{max}$ of the aperture arrangement.

Using a multitude of such filters, a high spectral resolution and consequently a high correction accuracy may be obtained by the multispectral iris device of this embodiment.

In another embodiment of the inventive iris device the filter layer comprises a plurality of sub-layers of at least two different dielectric materials with at least one of different refractive indices and different layer thicknesses, wherein the different sub-layers are at least partially embodied on the substrate in an alternating manner, and in that the filter layer is embodied on an outer portion of the substrate which encloses an untreated portion, the dimension of the untreated portion within the plane of the substrate defining the diameter of the aperture.

Commonly, highly efficient mirrors and optical devices as filters are obtained by providing the substrate with a dielectric coating, wherein a dielectric coating comprises a multitude of single layers. The refractive indices, the layer thicknesses and the number of such layers, as well as the refractive index of the adjacent layer define the reflection or transmission behavior which furthermore depends on the wavelength.

Recent advancements in optical filter design and manufacturing allow for highly reflective layers, highly transmissive layers, partly transmissive layers and the above described filters with different filter characteristics.

One filter layer may therefore define a multitude of spectral bands which are individually affected by the filter layer. By providing the filter layer in a ring-shape, the effect of the filter layer on a specific spectral band therefore only applies in the outer portion of the ring, the untreated surrounded portion consequently defines the diameter of the aperture for each of the affected spectral bands.

In another embodiment of the iris device at least one of the at least two apertures has, for a given spectral band, a variable diameter.

This embodiment has the advantage that a first spectral band may have a fixed aperture size, whereas the aperture size of a second spectral band, which may be subject to changing illumination conditions, may be varied according to changed conditions.

In another embodiment of the iris device, the iris device comprises a diaphragm with a variable diameter, wherein components of the diaphragm have a spectral selective light transmissivity.

This embodiment has the advantage, that the matured filter design and coating manufacturing may be combined with opto-mechanical developments.

The components of the diaphragm may be a plurality of blades which are rotatably mounted at a circumferential portion of the diaphragm, wherein each blade of the plurality of blades is rotatable towards the center of the iris. The blades of the plurality of blades may comprise a first synchronizing element and a second synchronizing element for being synchronized to each other for performing an identical rotational movement. Each synchronizing element may be engaged to the synchronizing element of the adjacent blade such that a synchronized rotational movement of the plurality of blades may result in an increased or decreased aperture diameter.

Each blade of the plurality of blades may be embodied such that only a portion of the blade reaching into the maximum aperture of the aperture arrangement may comprise a filter of one of the aforementioned type. In particular, the synchronizing elements may be embodied at a portion of the individual blade which is made of a non-filter material, i.e. a metal.

The diaphragm may comprise any arbitrary number of blades, wherein different shapes of the blades are conceivable. Possible shapes are for instance a triangular shape, a rectangular shape or a kidney-shape, whereas the kidney-shape is preferred, as in general curved blades improve the roundness of the aperture opening.

In another embodiment of the inventive iris device, the iris device comprises an aperture magazine, the aperture magazine receives at least two aperture arrangements, each in a movable iris receptacle, wherein one of the at least two movable iris receptacles is moved into the optical axis of the optical imaging system.

This embodiment of the iris device has the advantage that different subsets of iris devices may be stored in the aperture magazine and easily applied to the optical imaging system.

Only one aperture arrangement may be provided in the light transmission path, that is, only one subset of the plurality of aperture arrangements affects the light transmitted through the iris device. The other, i.e. the non-active aperture arrangement, may be stored outside the optical path of the light transmitted through the iris device.

The apertures magazine may further comprise a moving device for storing and transporting the individual apertures devices out of or into the light transmission of the iris device.

In another embodiment of the inventive iris device the aperture magazine is embodied as a filter wheel.

A filter wheel may be easily aligned with respect to the optical axis of the iris device and may be intuitively operated.

During operation of an iris device according to this embodiment, a replacement of aperture arrangements currently not active, i.e. currently not inserted into the light transmission path, may be conceivable.

The medical imaging system mentioned in the beginning may comprise an arbitrary number of the inventive iris devices of the same or different embodiments. Exemplary medical imaging systems comprise microscopes or surgical microscopes. Said medical imaging systems may provide different operation modes which may be simultaneously used. Exemplarily, as mentioned in the beginning, the color reflectance mode and fluorescence mode may be applied simultaneously by such an inventive medical imaging system.

The invention is explained in greater detail below by way of example using several embodiments with reference to the appended drawings. The embodiments merely represent possible configurations in which individual features, as described above, can be realized and omitted independently of each other. In the description of the embodiments, for simplicity the same features and elements are provided with the same reference numerals.

DETAILED DESCRIPTION OF THE INVENTION

Figure 1:
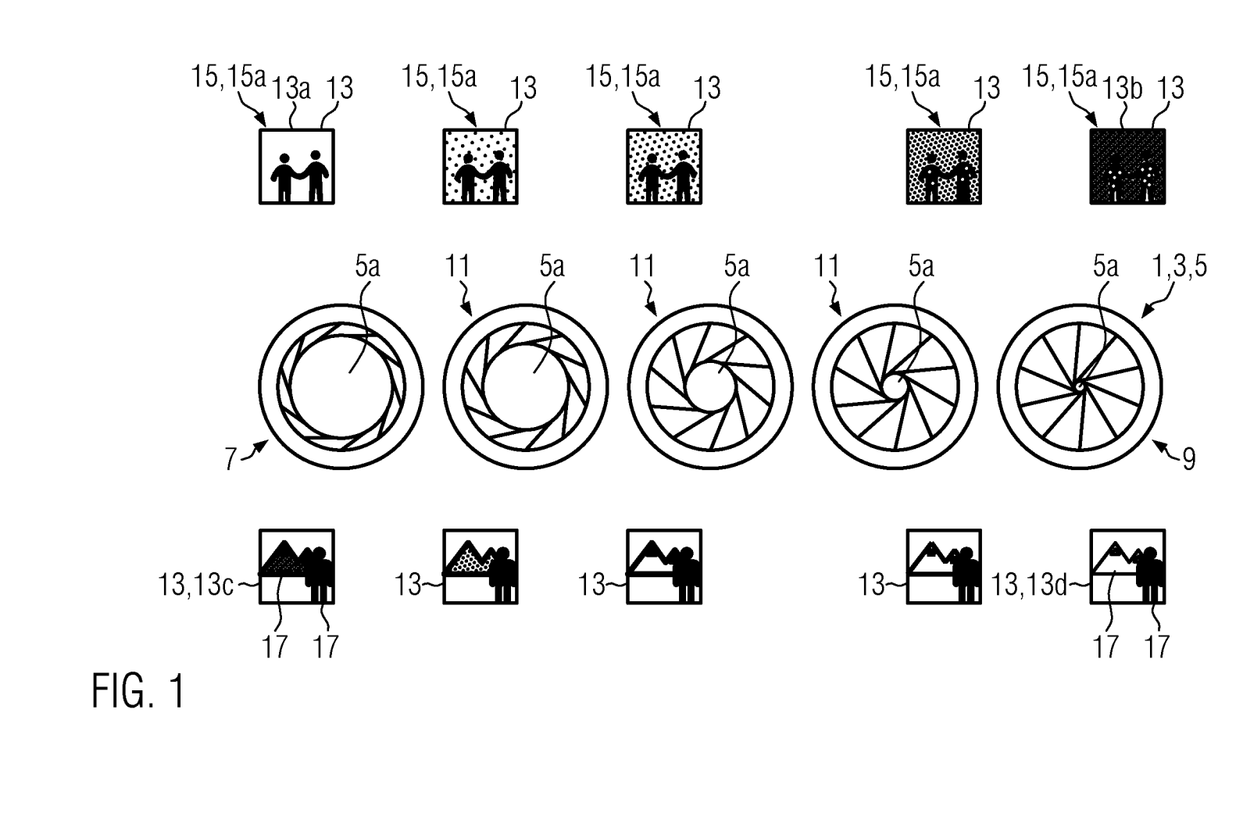
FIG. 1 illustrates the relationship between the aperture and the amount of transmitted light and the relationship between the aperture and the depth of field.

FIG. 1 shows an iris device 1, which is embodied as a single iris 3. The single iris 3 also represents the aperture arrangement 5, which is shown in five different states comprising an open state 7 and a closed state 9 of an aperture 5a.

In between the open state 7 and a closed state 9 three intermediate states 11 are shown. The upper panel of FIG. 1 shows five exemplary images 13 detected by a sensor 15. The sensor 15 may be embodied as a camera 15a.

It can be seen that for an open state 7 of the iris 3, respectively the aperture 5a, a first image 13a does not show any artifacts caused by a low light intensity, whereas for a closed state 9 of the iris 3, a second image 13b shows artifacts due to the low light intensity.

In the lower panel, five images 13 are shown, whereas the images 13 comprise two objects 17 which are located at different distances to the optical imaging system.

In case of an open state 7 of the iris 3 only one object 17 may be sharply imaged whereas the other object appears blurred in the image. This is shown in the third image 13c, whereas in the fourth image 13d, which corresponds to the closed state 9 of the iris 3, both objects 17 are imaged sharply.

Figure 2:
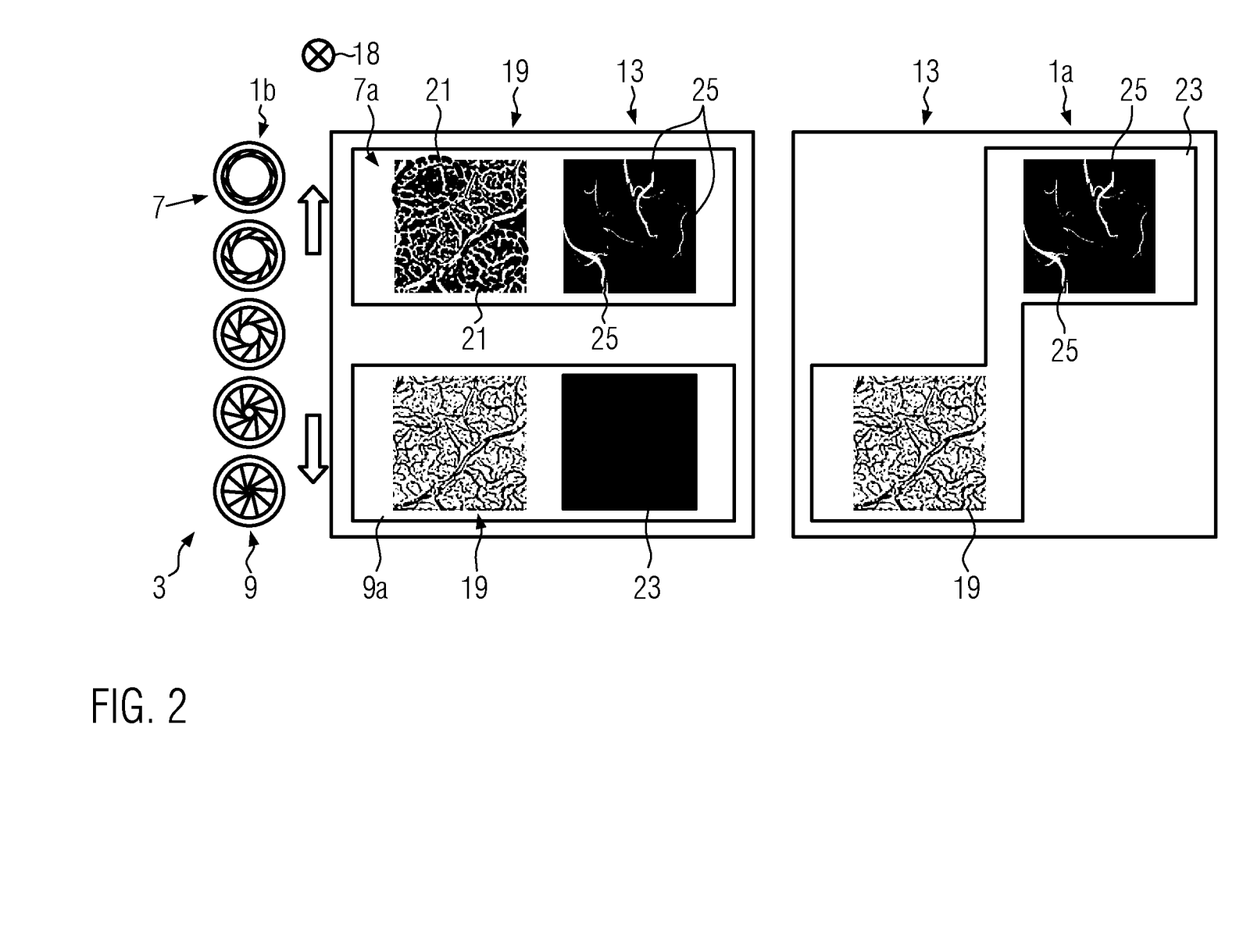
FIG. 2 illustrates the advantage of a multispectral iris device over a conventional iris device.

FIG. 2 shows the advantages of a multispectral iris device 1a over a conventional iris device 1b.

The images 13 shown in FIG. 2 are exemplarily taken with an optical microscope with two different operation modes. In the case of the conventional iris device 1b an open state 7 will result in an open state result 7a, whereas the closed state 9 of the Iris 3 will result in a closed state result 9a.

In the open state result 7a, the color reflectance image 19, which is obtained by illumination of a sample with a source of illumination 18, comprises blurred regions 21 and the fluorescence image 23 clearly shows fluorescent structures 25. The fluorescence image 23 is also obtained by illumination with a source of illumination 18, wherein different sources of illumination 18 may be applied for the color reflectance image 19 and the fluorescence image 23.

On the contrary, if the closed state 9 of the iris 3 is chosen, the color reflectance image 19 does not show any blurred regions 21 and is completely focused, whereas the fluorescence image 23 is completely black and does not show any fluorescent structure 25.

Therefore, a conventional iris device 1b always requires deciding a setting of the conventional iris device 1b, which is between the optimum for the color reflectance mode and the optimum for the fluorescence mode.

The right-hand side of FIG. 2 represents the color reflectance image 19 and fluorescence image 23 recorded with the inventive multispectral iris device 1a. As can be seen, the color reflectance image 19 does not show any blurred region 21 and the fluorescence image 23 does, at the same time, show clear fluorescent structures 25.

Thus, the inventive multispectral iris device 1a allows simultaneously providing the optimal setting for the color reflectance mode and the fluorescence mode.

Figure 3:
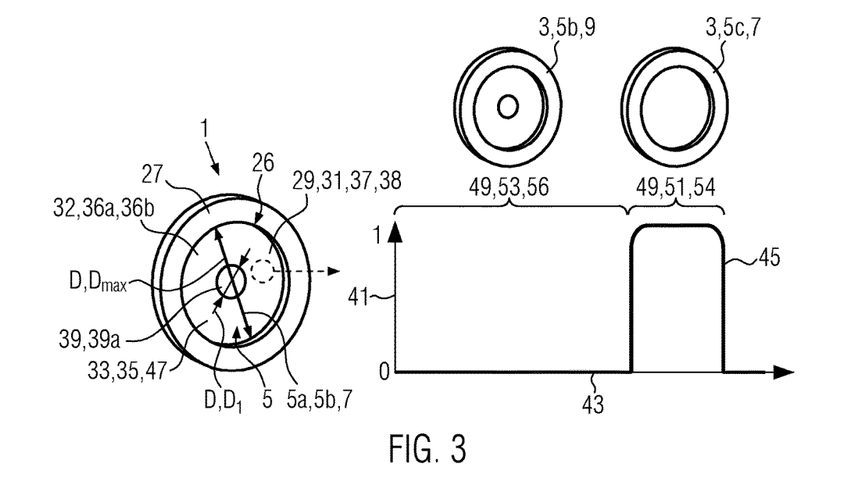
FIG. 3 illustrates a first embodiment of the inventive iris device.

FIG. 3 shows that the first embodiment of an inventive iris device 1, which comprises an aperture arrangement 5 and two apertures 5a, a first aperture 5b represents the open state 7 and has a diameter D which equals the maximum diameter $D_{max}$. In other words, the first aperture 5b of the two apertures 5a is limited by an iris frame 27.

The iris frame 27 surrounds a filter system 26 and receives a substrate 29 which comprises a filter 31, which is comprised of a filter layer 32 with a plurality of sub-layers 33 of at least two different dielectric materials 35.

The different dielectric materials 35 may have a different refractive index 36a and/or a different layer thickness 36b.

The filter 31 is embodied in a ring-shape 37, i.e. the filter surrounds a central aperture region 39 with an outer portion 38, the central aperture region 39 having an aperture diameter D which is a first diameter $D_1$ which is smaller than the maximum diameter of the apertures $D_{max}$. The central apertures region 39 is an untreated portion 39a.

The right-hand side of FIG. 3 shows a functional dependence of the transmissivity 41 on the wavelength 43. The simplified filter characteristics 45 shows a bandpass filter 47 which defines two different spectral bands 49, namely, as shown in FIG. 3, the fluorescence band 51 and a residual spectral band 53, which is, simply speaking, comprising all wavelengths 43 spectrally located below the fluorescence band 51. The fluorescence band 51 is a light transmitting spectral band 54 for the filter system 26 of the iris device 1 shown in FIG. 3, whereas the residual spectral band 53 is a light blocking spectral band 56.

The filter characteristics 45 indicate that within the fluorescence band 51, the transmissivity 41 of the bandpass filter 47 equals 1, whereas for the residual spectral band 53 the transmissivity 41 equals 0.

Due to its filter characteristics 45 the ring-shaped filter 31 acts as an iris 3 with a first aperture 5b for all wavelengths 43 smaller than the wavelength 43 of the fluorescence band 51.

All wavelengths 43 of the fluorescence band 51 are transmitted through an iris 3 with a second aperture 5c, which in this case corresponds to an open state 7 of the iris 3.

Therefore, the residual spectral band 53, which may be the spectral band 49 of the color reflection mode, is affected by the first aperture 5b which is in a closed state 9, which consequently increases the depth of field for the residual spectral band 53. On the other hand, the fluorescence band 51 which may be a spectral band 49 with a low light intensity, profits from an open state 7 of the iris 3.

Figure 4:
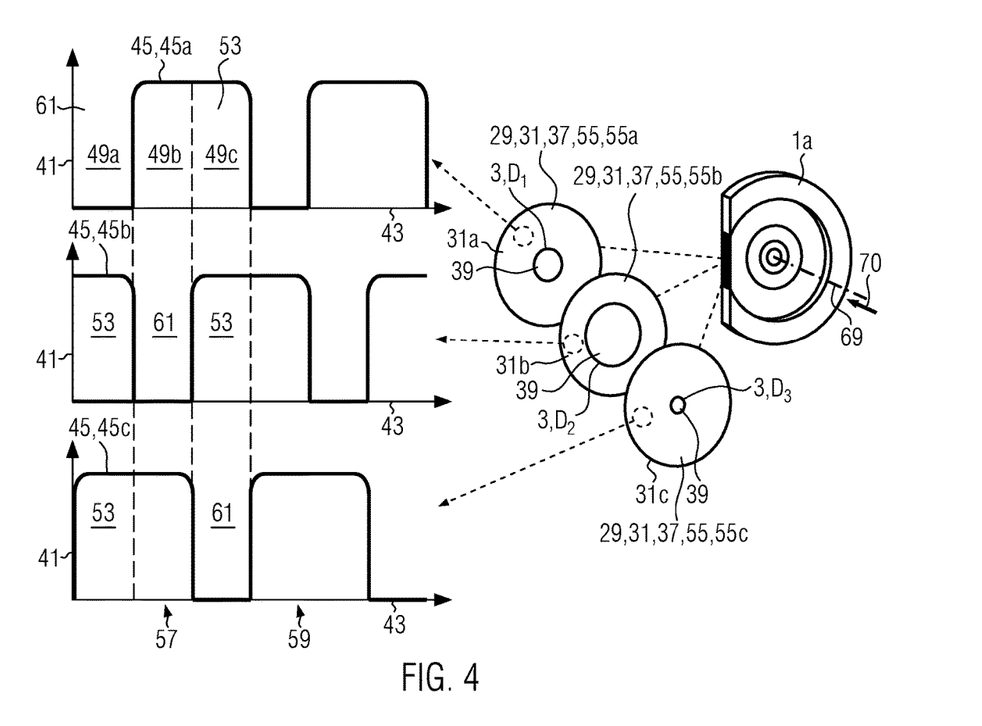
FIG. 4 illustrates a second embodiment of the inventive iris device.

An optical axis 69 is not shown in FIG. 3 for reasons of clarity but may be seen in FIG. 4.

FIG. 4 shows a second embodiment of the inventive multispectral iris device 1a, which comprises three individual substrates 29, each comprising a filter 31. Each of the filters 31 is embodied in a ring-shape 37 and comprises a central aperture region 39 having a first aperture diameter $D_1$, a second aperture diameter $D_2$ and a third aperture diameter $D_3$.

Figure 6:
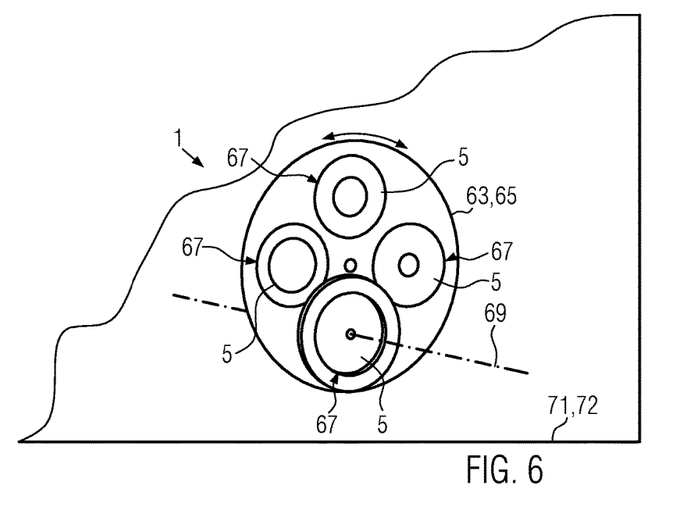
FIG. 6 illustrates a fourth embodiment of the inventive iris device.

The inventive multispectral iris device 1a is oriented essentially centered and perpendicular to the optical axis 69, which is defined by the optical imaging system (see FIG. 6). A light-transmission direction 70 is indicated as well, which is oriented parallel to the optical axis 69.

In FIG. 4 the third diameter $D_3$ is smaller than the first diameter $D_1$, which is in turn smaller than the second diameter $D_2$.

Furthermore, each of the three filters 31 comprises a filter characteristics 45 being denoted 45a, 45b and 45c. Each filter 31 is a band-stop filter 55, more specifically a multiple band-stop filter.

The first 45a, second 45b and third filter characteristics 45c belong to a first band-stop filter 55a, a second band-stop filter 55b and a third band-stop filter 55c and will be explained in the following with the short-wavelength side 57 of the filter characteristics 45 shown, as the principal is repeated on the long-wavelength side 59.

Each of the filter characteristics 45a, 45b and 45c comprises at least two spectral bands 49, namely a spectral stop band 61 which is the light blocking spectral band 56 and which is spectrally located adjacent to at least one residual spectral band 53.

The embodiment of the multispectral iris device 1a shown in FIG. 4 separates the short-wavelength side 57 in three spectral bands 49a, 49b and 49c, whose separation is valid for all three filter characteristics 45a-45c.

The first filter characteristic 45a yields a zero transmissivity 41 for the first spectral band 49a, the second filter characteristics 45b yields a zero transmissivity 41 for the second spectral band 49b, and the third filter characteristics 45c yields a zero transmissivity 41 for the third spectral band 49c.

Each filter characteristics 45a-45c yields a transmissivity 41 of one for the two out of the three spectral bands 49a-49c which are not the spectral stop band 61 of the corresponding filter characteristics 45a-45c.

FIG. 4 furthermore shows that the spectral band 49a-49c are adjacent to each other but do not overlap, i.e. there is no wavelength which is neither blocked by the first filter 31a, nor by the second filter 31b, nor by the third filter 31c.

Furthermore, the filter characteristics 45a-45c shown in the left-hand side of FIG. 4 are combined with the spatial structure of the filter, i.e. the ring-shape 37 and the corresponding aperture diameter $D_1$-$D_3$.

In the present embodiment shown in FIG. 4, the spectral stop band 61 of the first filter characteristics 45a is transmitted through an iris 3 with a diameter $D_1$, the spectral stop band 61 of the second filter characteristics 45b is transmitted through an iris 3 of diameter $D_2$ and the spectral stop band 61 of the third filter characteristics 45c is transmitted through an iris 3 of the diameter $D_3$.

Figure 5:
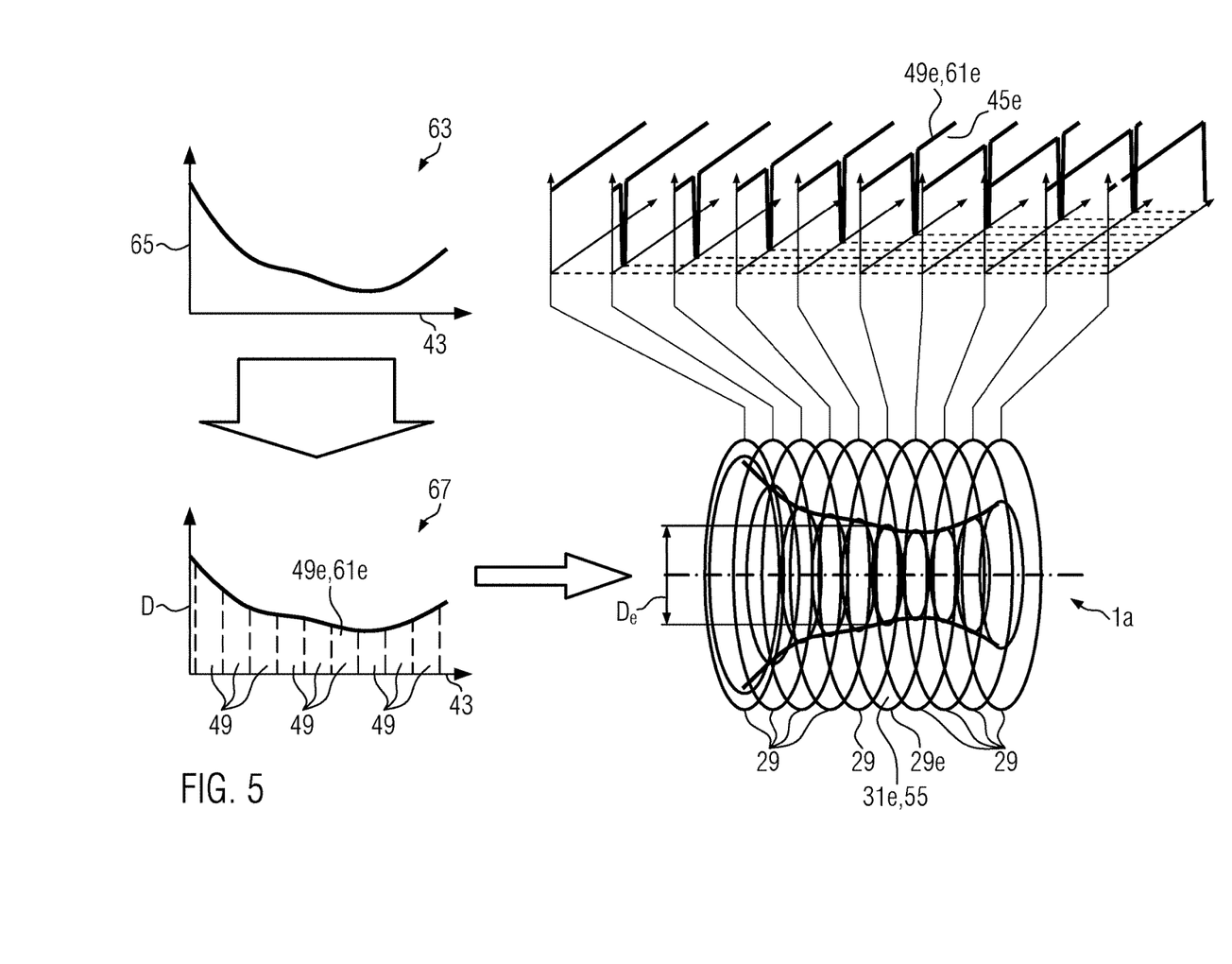
FIG. 5 illustrate a third embodiment of the inventive iris device.

FIG. 5 shows a third embodiment of the inventive multispectral iris device 1a and respective design steps.

The plot shown in the upper left side of FIG. 5 illustrates the desired throughput plot 63 which shows the functional dependence of the throughput 65 on the wavelength 43.

The lower left side of FIG. 5 illustrates the functional dependence of the aperture diameter D on the wavelength 43. This diameter plot 67 is calculated from the desired throughput plot 63.

In the diameter plot 67 a multitude of spectral bands 49 is shown, whereas for each of the spectral bands 49 a diameter D may be determined. This is exemplarily shown for the example spectral band 49e, which has an aperture diameter $D_e$. The corresponding aperture diameter $D_e$ may also be seen in the lower right panel of FIG. 5, where the corresponding example substrate 29e is provided with an example filter 31e. The example filter 31e has an example filter characteristics 45e, which is shown in the upper right panel of FIG. 5.

In the example filter characteristics 45e the band-stop filter 55 comprises a spectral stop band 61, which corresponds to the example spectral band 49e. In other words, the aperture diameter $D_e$ only applies to the example spectral band 49e which corresponds to the example spectral stop band 61e.

Wavelengths 43 located outside the example spectral stop band 61e are not affected by the example filter 31e and are transmitted through the respective example filter 31e.

In conclusion, each of the plurality of filters 31 of substrates 29 only applies to the corresponding spectral stop band 61 indicated in the upper right panel of FIG. 5.

FIG. 6 shows a fourth embodiment of the inventive iris device 1, wherein the iris device 1 comprises an aperture magazine 64 which is embodied as a filter wheel 66. The filter wheel 66 receives, in the embodiment shown, four aperture arrangements 5 in four moveable iris receptacles 68 of the filter wheel 66.

Only one of the aperture arrangements 5 is inserted into and aligned to the optical axis 69 of the optical imaging system 71. The optical imaging system 71 is only indicated and may for instance be a medical imaging system 72.

Figure 7:
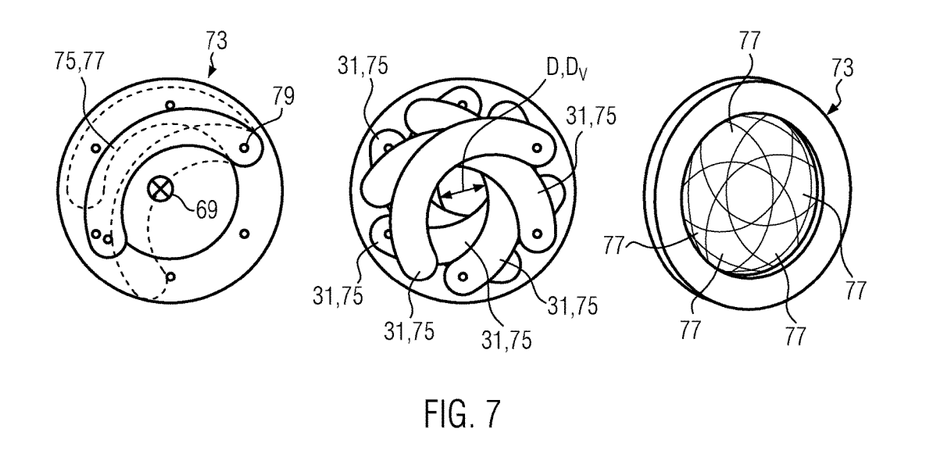
FIG. 7 illustrates a fifth embodiment of the inventive iris device.

FIG. 7 shows a fifth embodiment of the inventive iris device 1 in which a known mechanical diaphragm 73 with components 75 is combined with the inventive filters 31. Each of the components 75 is embodied as a blade 77 with a kidney-shaped, which is only indicated in the left diaphragm 73 of FIG. 7 for reasons of clarity.

The left side of FIG. 7 shows one isolated blade 77 which is fixed at a rotation center 79 and which may be moved towards the optical axis 69, which is indicated as an encircled X.

If all blades 77 of the diaphragm 73 shown in FIG. 7 are rotated towards the optical axis 69, the movement of all blades 77 is synchronized, the aperture diameter D of the resulting filter geometry is a variable diameter $D_d$.

As the blades 77 of the diaphragm 73 are embodied as filters 31 with a corresponding filter characteristics (not shown), the resulting variable diameter $D_d$ only applies to the spectral band (not shown) which is affected by the filter 31 used.

The right-hand side of FIG. 7 shows a diaphragm 73 with a second embodiment of blades 77 of a different shape.

Figure 8:
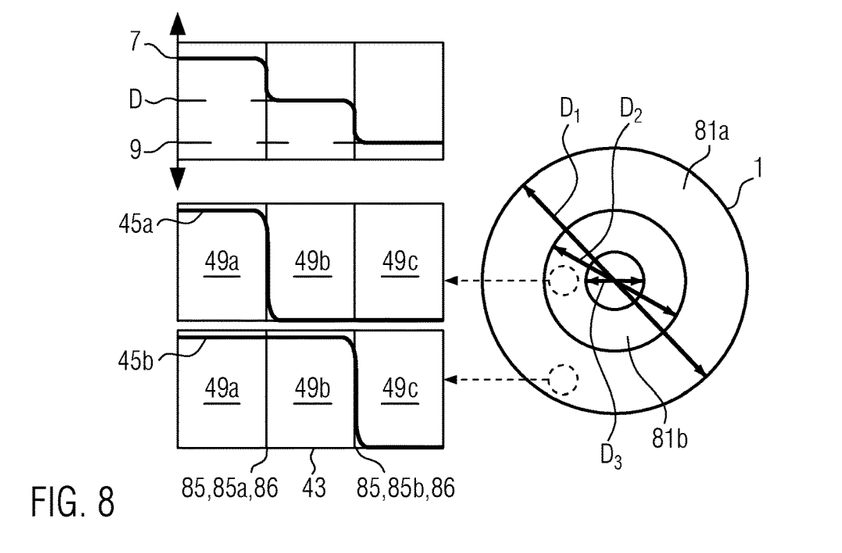
FIG. 8 illustrates a sixth embodiment of the inventive iris device.

FIG. 8 shows a sixth embodiment of the inventive iris device 1 which is comprising two edge filters 81, wherein the shown iris device 1 is used for color imaging, in particular to tune the relative intensity of colors inverse proportionally to the sensors sensitivity.

The iris device 1 comprises of two edge filters 81a and 81b having a first filter characteristics 45a and a second filter characteristics 45b.

Each of the edge filters 81 is embodied as a low-past filter 83, i.e. wavelengths 43 shorter than an edge wavelength 85 are completely transmitted, whereas wavelengths 43 longer than the edge wavelength 85 are blocked by the corresponding edge filter 81. The edge wavelength 85 represents a spectral filter edge 86.

The first edge filter 81a has a first edge wavelength 85a and the second edge filter 81b has a second edge wavelength 85b. All wavelengths 43 shorter than the first edge wavelength 85a are completely transmitted by either of the two edge filters 81 and interact with the aperture of diameter D corresponding to the open state 7. Those wavelengths constitute a first spectral band 49a.

Wavelengths of the first spectral band 49a have a first aperture diameter $D_1$.

Accordingly, the second spectral band 49b located in between the two edge wavelengths 85a and 85b have an aperture diameter $D_2$ and wavelengths located in the third spectral band 49c have the aperture diameter $D_3$.

Figure 9:
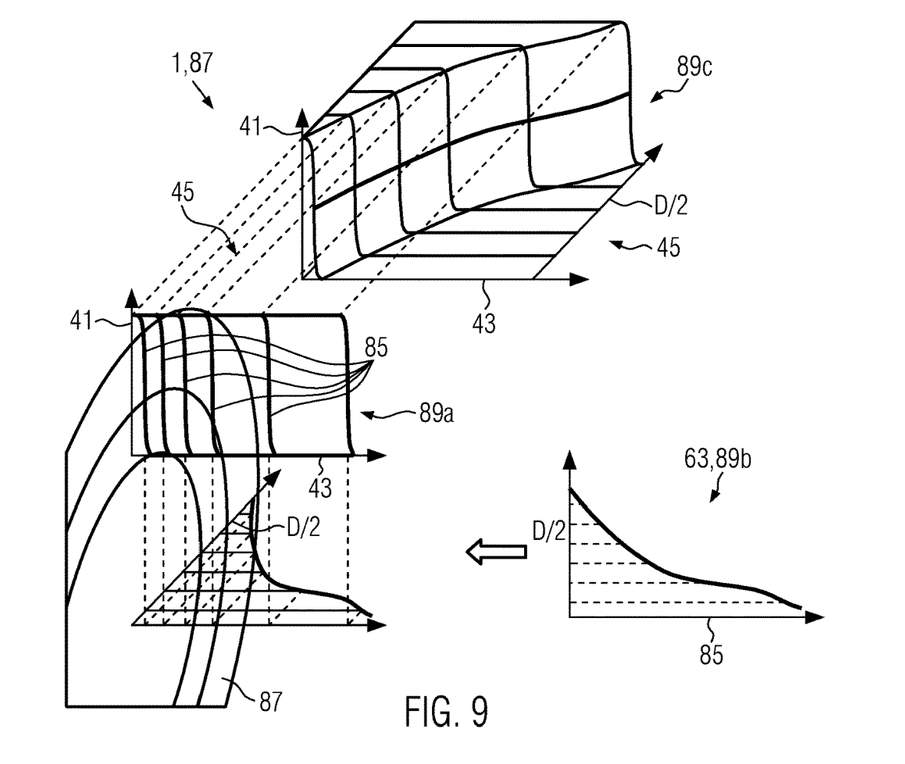
FIG. 9 illustrates a seventh embodiment of the inventive iris device.

FIG. 9 shows a seventh embodiment of the inventive iris device 1, which is embodied as a linear variable edge filter 87.

The linear variable edge filter 87 comprises a multitude of filter characteristics 45 which are shown in different plots. A first plot 89a shows the dependence of the transmissivity 41 on the wavelength 43, whereas the different edge wavelengths 85 shown correspond to different radiuses D/2.

A second plot 89b represents the desired throughput plot 63 and shows the dependence of the radius D/2 on the edge wavelength 85.

The third plot 89c is a three-dimensional plot of the transmissivity 41, the wavelength 43 and the radius D/2. The third plot 89c shows the dependence of the transmissivity 41 on the spatial coordinate, the radius D/2 and the spectral coordinate, the wavelength 43.

REFERENCE SIGNS 1 iris device
1a multispectral iris device
1b conventional iris device
3 iris
5 aperture arrangement
5a aperture
5b first aperture
5c second aperture
7 open state
7a open state result
9 closed state
9a closed state result
11 intermediate state
13 images
13a first image
13b second image 13c third image
13d fourth image
15 sensor
15a camera
17 object
18 source of illumination
19 color reflectance image
21 blurred region
23 fluorescence image
25 fluorescent structure
26 filter system
27 iris frame
29 substrate
29e example substrate
31 filter
31a first filter
31b second filter
31c third filter
31e example filter
32 filter layer
33 plurality of sub-layers
35 dielectric material
36a refractive index
36b layer thickness
37 ring-shape
38 outer portion
39 central aperture region
39a untreated portion
41 transmissivity
43 wavelength
45 filter characteristics
45a first filter characteristics
45b second filter characteristics
45c third filter characteristics
45e example filter characteristics
47 bandpass filter
49 spectral band
49a first spectral band
49b second spectral band
49c third spectral band
49e example spectral band
51 fluorescence band
53 residual spectral band
54 light transmitting spectral band
55 band-stop filter, such as a multiple band-stop filter
55a first band-stop filter
55b second band-stop filter
55c third band-stop filter
56 light blocking spectral band
57 short-wavelength side
59 long-wavelength side
61 spectral stop band
63 desired throughput plot
64 aperture magazine
65 throughput
66 filter wheel
67 diameter plot
68 iris receptacle
69 optical axis
70 light-transmission direction
71 optical imaging system
72 medical imaging system
73 diaphragm
75 component
77 blade
79 rotation center
81 edge filters
81a first edge filter
81b second edge filter
85 edge wavelength
86 spectral filter edge
87 linear variable edge filter
89a first plot
89b second plot
89c third plot
$D_1$ first diameter
$D_2$ second diameter
$D_3$ third diameter
$D_{max}$ maximum diameter
$D_e$ example diameter
$D_v$ variable diameter
$D/_2$ distance to optical axis/radius

What is claimed is:

1. An iris device for optical imaging systems, the iris device comprising an aperture arrangement, the aperture arrangement comprising an integrated filter system limiting light at different degrees of limitation in at least two different wavelengths, wherein the filter system comprises a plurality of filters including:
 a first band-stop filter defining a first spectral band and having a first aperture;
 a second band-stop filter defining a second spectral band and having a second aperture; and
 a third band-stop filter defining a third spectral band and having a third aperture;
 wherein the first aperture is smaller or larger than each of the second and third apertures; and
 wherein the first spectral band is spectrally located between the second spectral band and the third spectral band.

2. The iris device according to claim 1, wherein the filter system comprises at least one filter having at least one light transmitting spectral band.

3. The iris device according to claim 1, wherein the filter system comprises at least one filter having at least one light blocking spectral band.

4. The iris device according to claim 3, wherein the filter system comprises at least one ring-shaped edge filter which surrounds a central aperture region and in that the central aperture region is an aperture.

5. The iris device according to claim 1, wherein the filter system includes at least one filter layer embodied on a substrate.

6. The iris device according to claim 1, wherein the first band-stop filter applies to at least one of a high spectral density of a source of illumination and a high sensor sensitivity, the second band-stop filter applies to at least one of a low spectral density of the source of illumination and a low sensor sensitivity, and a diameter of the first aperture is smaller than a diameter of the second aperture.

7. The iris device according to claim 1, wherein the aperture arrangement includes at least two apertures, and one of the at least two apertures has, for a given spectral band, a variable diameter.

8. The iris device according to claim 7, wherein the iris device comprises a diaphragm having a variable diameter, the diaphragm comprising components having a spectral selective light transmissivity.

9. The iris device according to 1, further comprising an aperture magazine, wherein the aperture magazine receives at least two aperture arrangements each in a respective movable iris receptacle, wherein one of the at least two movable iris receptacles is moved into the optical axis of the optical imaging system for use.

10. The iris device according to claim 9, wherein the aperture magazine is embodied as a filter wheel.

11. An iris device for optical imaging systems, the iris device comprising an aperture arrangement, the aperture arrangement comprising an integrated filter system limiting light at different degrees of limitation in at least two different wavelengths, wherein the filter system comprises at least one filter having at least one light transmitting spectral band, wherein the filter system comprises at least one linear variable edge filter having a spectral filter edge, whose spectral position varies depending on a distance to an optical axis of the iris device.

12. An iris device for optical imaging systems, the iris device comprising an aperture arrangement, the aperture arrangement comprising an integrated filter system limiting light at different degrees of limitation in at least two different wavelengths, wherein the filter system includes at least one filter layer embodied on a substrate, wherein the filter layer comprises a plurality of sub-layers of at least two different dielectric materials having at least one of different refractive indices and different layer thicknesses, wherein the different sub-layers are at least partially embodied on the substrate in an alternating manner, and wherein the filter layer is embodied on an outer portion of the substrate, wherein the outer portion encloses an untreated portion, and the dimension of the untreated portion within the plane of the substrate defines the diameter of the aperture.

13. A medical imaging system comprising:
a sensor for detecting an image; and
at least one iris device comprising an aperture arrangement, the aperture arrangement comprising an integrated filter system limiting light at different degrees of limitation in at least two different wavelengths.

14. The medical imaging system according to claim 13, wherein the sensor is a camera.

* * * * *